United States Patent
Sato

(10) Patent No.: US 8,934,944 B2
(45) Date of Patent: Jan. 13, 2015

(54) MOBILE TERMINAL DEVICE

(75) Inventor: Takuya Sato, Daito (JP)

(73) Assignee: KYOCERA Corporation, Kyoto (JP)

( * ) Notice: Subject to any disclaimer, the term of this patent is extended or adjusted under 35 U.S.C. 154(b) by 135 days.

(21) Appl. No.: 13/637,514

(22) PCT Filed: Mar. 24, 2011

(86) PCT No.: PCT/JP2011/057089
§ 371 (c)(1),
(2), (4) Date: Sep. 26, 2012

(87) PCT Pub. No.: WO2011/118677
PCT Pub. Date: Sep. 29, 2011

(65) Prior Publication Data
US 2013/0012273 A1 Jan. 10, 2013

(30) Foreign Application Priority Data
Mar. 26, 2010 (JP) .................... 2010-073286

(51) Int. Cl.
*H04M 1/00* (2006.01)
*H04B 1/38* (2006.01)
(Continued)

(52) U.S. Cl.
CPC ............ G06F 1/1624 (2013.01); G06F 1/1647 (2013.01); H04M 1/0235 (2013.01); H04M 1/0247 (2013.01); H04M 1/0214 (2013.01); H04M 1/0239 (2013.01); H04M 2250/16 (2013.01)
USPC ..... 455/566; 455/90.3; 455/575.3; 455/575.4

(58) Field of Classification Search
CPC ............ H04M 1/0214; H04M 1/0235; H04M 1/0237; H04M 1/0245; H04M 1/23; H04M 1/72519; H04M 1/72583; H04M 2250/16
USPC ............... 455/566, 575.1, 575.3, 575.4, 90.3; 379/433.04, 433.12, 433.13, 434
See application file for complete search history.

(56) References Cited

U.S. PATENT DOCUMENTS

| | | | |
|---|---|---|---|
| 6,907,276 B2 * | 6/2005 | Toba | 455/566 |
| 6,941,160 B2 * | 9/2005 | Otsuka et al. | 455/566 |
| 7,460,108 B2 * | 12/2008 | Tamura | 455/566 |

(Continued)

FOREIGN PATENT DOCUMENTS

| | | |
|---|---|---|
| JP | 2002-044202 A | 2/2002 |
| JP | 2003-169372 A | 6/2003 |

(Continued)

OTHER PUBLICATIONS

International Preliminary Report on Patentability issued by the International Bureau of WIPO.

(Continued)

*Primary Examiner* — Quochien B Vuong
(74) *Attorney, Agent, or Firm* — Procopio, Cory, Hargreaves & Savitch LLP

(57) ABSTRACT

A cellular phone includes a first display, a second display, and a CPU. The cellular phone is configured to be switchable between a first state in which the first display, out of the first display and the second display, is exposed to the outside and a second state in which both of the displays are exposed to the outside. When an application is operated and shown on the first display in the first state, the CPU sets another application associated with the application in an operational state.

14 Claims, 18 Drawing Sheets

(51) Int. Cl.
*G06F 1/16* (2006.01)
*H04M 1/02* (2006.01)

(56) References Cited

U.S. PATENT DOCUMENTS

| | | | |
|---|---|---|---|
| 8,498,674 B2 * | 7/2013 | Kokubo | 455/566 |
| 8,593,371 B1 * | 11/2013 | Park | 455/566 |
| 2005/0083642 A1 | 4/2005 | Senpuku et al. | |
| 2005/0140574 A1 | 6/2005 | Tamura | |
| 2007/0285401 A1 | 12/2007 | Ohki et al. | |
| 2009/0048001 A1 * | 2/2009 | Mihara et al. | 455/566 |

FOREIGN PATENT DOCUMENTS

| | | |
|---|---|---|
| JP | 2005-198259 A | 7/2005 |
| JP | 2007-124025 A | 5/2007 |
| JP | 2007-142762 A | 6/2007 |
| JP | 2007-221829 A | 8/2007 |
| JP | 2008-177876 A | 7/2008 |
| WO | 03/077097 A1 | 9/2003 |
| WO | 2006/051669 A1 | 5/2006 |

OTHER PUBLICATIONS

International Search Report dated Jul. 5, 2011, issued for International Application No. PCT/JP2011/057089.

* cited by examiner

CORRESPONDENCE TABLE

| APPLICATIONS (AP1) TO BE ACTIVATED ON FIRST DISPLAY | APPLICATIONS (AP2) TO BE ACTIVATED ON SECOND DISPLAY |
|---|---|
| APPLICATION A | APPLICATION L |
| APPLICATION B | APPLICATION M |
| APPLICATION C | APPLICATION N |
| ............ | ............ |

FIG. 8

MOBILE TERMINAL DEVICE

TECHNICAL FIELD

The present invention relates to mobile terminal devices such as cellular phones and personal digital assistants (PDAs).

BACKGROUND ART

In general, cellular phones show operation screens, e-mail documents, television pictures, or the like, on their displays formed by liquid crystal panels or the like. In recent years, configuring a cellular phone with two displays has been under consideration. In this case, for example, the cellular phone has a second display laid over a first display, and the first display is moved in a state in which only the first display is exposed to the outside, whereby the cellular phone is switched to a state in which both of the displays are exposed to the outside.

On such a cellular phone, when the second display is opened, large amounts of text and images can be shown or the text and images can be enlarged on a large-sized display surface formed by the two displays. In addition, different applications can be activated concurrently on the respective displays.

SUMMARY OF INVENTION

Technical Problem

In the foregoing cellular phone, a predetermined application may be executed in a state in which only the first display is exposed to the outside. In this case, a user may wish to view also an operation screen for an application other than the currently executed. At that time, the user, for example, has to expose the second display to the outside and then activate the other application. This requires the user to perform a plurality of operations. Besides, after performing an operation for the activation, the user has to wait for the activation of the other application, which may give the user the impression that the cellular phone lacks convenience.

The present invention is devised in light of the foregoing problem, and an object of the present invention is to provide a mobile terminal device that, when being switched to a display state with the two display modules, quickly displays an operation screen for another application.

Solution to Problem

A mobile terminal device of the present invention includes a first display module, a second display module, a control module, and a switch module which switches between a first state in which the first display module, out of the first display module and the second display module, is exposed to outside and a second state in which both the first display module and the second display module are exposed to outside. In this arrangement, when a first application is operated and shown on the first display module in the first state, the control module sets a second application associated with the first application, in an operational state.

According to the mobile terminal device of the present invention, the second application is in the operational state in the first state, and thus when a switch to the second state takes place, an operation screen for the second application can be quickly displayed.

Advantageous Effects of Invention

According to the mobile terminal device of the present invention, when a switch to the display state with the two display modules takes place, an operation screen for an application can be quickly shown on the display modules exposed to the outside.

Advantage and significance of the present invention will be further clearly understood by the following description of an embodiment. However, the following embodiment is merely an example for carrying out the present invention, and the present invention is not limited to by the following embodiment.

BRIEF DESCRIPTION OF DRAWINGS

FIG. 8 is a diagram showing contents of a correspondence table according to the embodiment;

Figure 1:
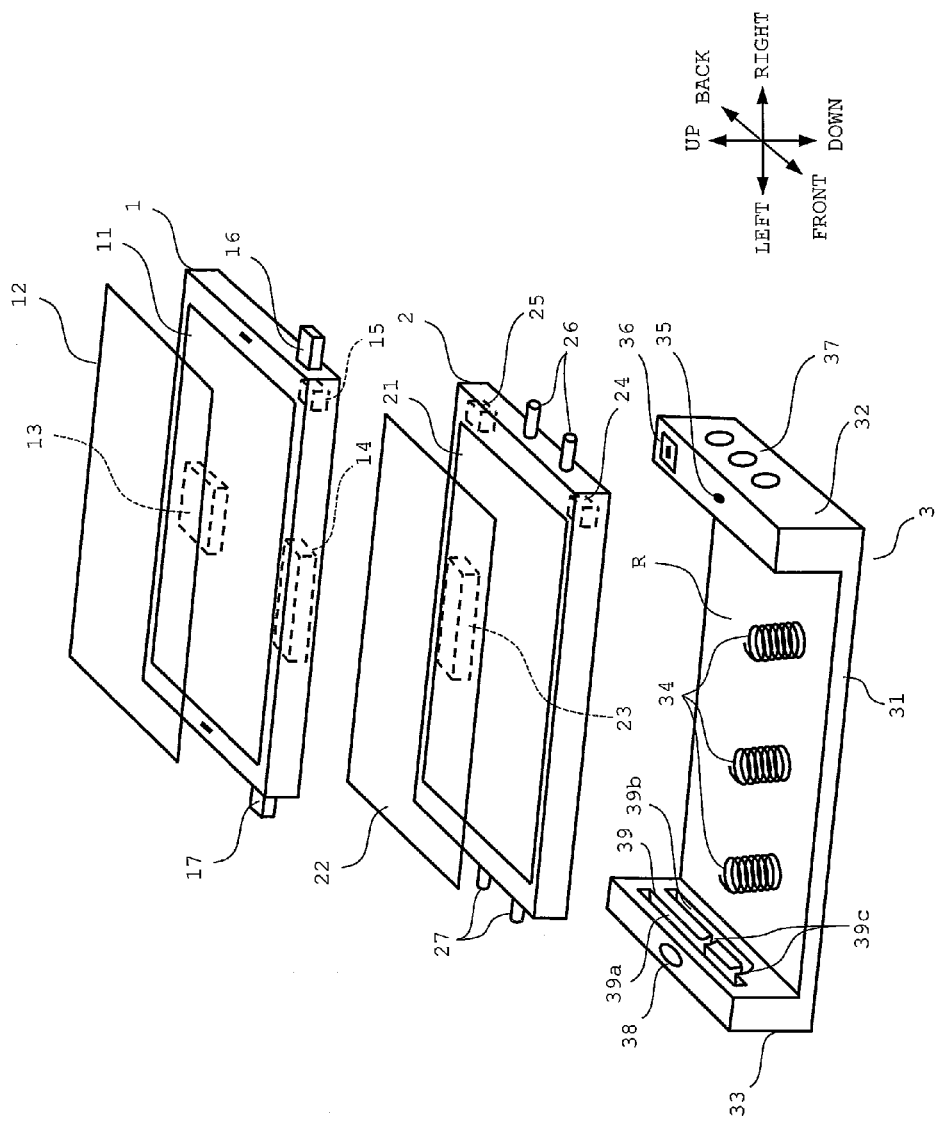
FIG. 1 is a diagram showing a configuration of a cellular phone according to an embodiment of the present invention.

However, the drawings are used solely for describing an example of the embodiment, and are not intended to limit the scope of the present invention.

DESCRIPTION OF EMBODIMENTS

An embodiment of the present invention will be described below with reference to the drawings.

In the embodiment, a first display 11 corresponds to a "first display module" recited in the claims, and a second display 21 corresponds to a "second display module" recited in the claims. Magnets 14 and 23, protrusion parts 16 and 17, shaft parts 26 and 27, coil springs 34, and guide grooves 39 constitute a "switch module" recited in the claims. A memory 200 corresponds to a "memory module" recited in the claims. A "control module," and "table setting module" recited in the claims are implemented as functions imparted to a CPU 100 by a control program stored in the memory 200. The foregoing correspondence between the claims and the description of the embodiment is merely an example, and is not intended to limit the scope of the claims to the embodiment.

<Configuration of a Cellular Phone>

FIG. 1 is a diagram (exploded perpendicular view) showing a configuration of a cellular phone. The cellular phone is formed by a first cabinet 1, a second cabinet 2, and a holding body 3 holding the first and second cabinets 1 and 2.

The first cabinet 1 has the shape of a horizontally-long rectangular parallelepiped. The first cabinet 1 is provided with a first display 11 such that a display surface thereof faces a front side of the first cabinet 1. The first display 11 is formed by a first liquid crystal panel 11a and a first backlight 11b illuminating the first liquid crystal panel 11a, as described later.

A first touch panel 12 is disposed on a front surface of the first display 11. The first touch panel 12 has the shape of a transparent sheet, and thus a display screen shown on the first display 11 can be seen through the first touch panel 12.

The first touch panel 12 includes first transparent electrodes and second transparent electrodes aligned in a matrix. The first touch panel 12 senses a change in electrostatic capacity between the transparent electrodes to detect a position touched by a user on a display surface, and outputs a position signal according to the position.

The first cabinet 1 has therein a camera module 13 at a position slightly backward from a center. The first cabinet 1 has a lens window (not shown) of the camera module 13 on a lower surface thereof for taking in images of a subject. The first cabinet 1 also has therein a magnet 14 at an intermediate position close to a front side and a magnet 15 at a front right corner. Further, the first cabinet 1 has protrusion parts 16 and 17 on right and left sides thereof.

The second cabinet 2 has the shape of a horizontally long rectangular parallelepiped. That is, the second cabinet 2 is almost the same in shape and size as the first cabinet 1. The second cabinet 2 is provided with a second display 21 such that a display surface thereof faces a front side of the second cabinet 2. The second display 21 is formed by a second liquid crystal panel 21a and a second backlight 21b illuminating the second liquid crystal panel 21a, as described later. The first display 11 and the second display 21 may be formed by other display elements such as organic ELs.

The second display 21 has a second touch panel 22 on a front surface thereof. The second touch panel 22 is configured in the same manner as the first touch panel 12.

The second cabinet 2 has therein a magnet 23 at an intermediate position close to a back side. The magnet 23 and the magnet 14 of the first cabinet 1 are configured so as to attract each other when the first cabinet 1 and the second cabinet 2 are positioned in a state to constitute a large-sized screen (opened state) as described later. Alternatively, if one of the magnets in the first cabinet 1 and the second cabinet 2 has a sufficiently large magnetic force, the other magnet may be replaced with a magnetic body.

The second cabinet 2 has therein a close sensor 24 disposed at a front right corner and an open sensor 25 at a back right corner. The sensors 24 and 25 are formed by hall ICs or the like, for example, and output detection signals in response to a magnetic force of the magnets. As described later, when the first cabinet 1 and the second cabinet 2 are overlapped each other, the magnet 15 of the first cabinet 1 comes close to the close sensor 24, and thus the close sensor 24 outputs an ON signal. Meanwhile, when the first cabinet 1 and the second cabinet 2 are aligned back and forth, the magnet 15 of the first cabinet 1 comes close to the open sensor 25, and thus the open sensor 25 outputs an ON signal.

Further, the second cabinet 2 has two shaft parts 26 on the right side thereof, and has two shaft parts 27 on the left side thereof.

The holding body 3 is formed by a bottom plate part 31, a right holding part 32 formed at a right end of the bottom plate part 31, and a left holding part 33 formed at a left end of the bottom plate part 31. The first cabinet 1 and the second cabinet 2 are stored in a vertically overlaid state in a storage region R surrounded by the bottom plate part 31, the right holding part 32, and the left holding part 33.

The bottom plate part 31 has three coil springs 34 aligned in a horizontal direction. When the second cabinet 2 is attached to the holding body 3, the coil springs 34 bring into contact with a lower surface of the second cabinet 2 to provide a force for raising the second cabinet 2.

The right holding part 32 has a microphone 35 and a power key 36 on an upper surface thereof. The right holding part 32 also has an operation key group 37 on an outer side surface thereof. Specific functions such as setting of a manner mode can be performed by operating the operation key group 37, without the need to operate the touch panels 12 and 22. The left holding part 33 has a telephone speaker 38 on an upper surface thereof. A user holds a conversation by holding the cellular phone by hand, such that the left holding part 33 side is positioned near his/her ear and the right holding part 32 side is positioned near his/her mouth. A user can also hold the conversation while checking an address book, without having to put an ear piece (telephone speaker 38) to his/her ear, as with a hands-free cellular phone.

The guide grooves 39 are formed on inner surfaces of the right holding part 32 and the left holding part 33 (illustrated only the left holding part 33 side). The guide grooves 39 include an upper groove 39a and a lower groove 39b extending in a front-back direction and two longitudinal grooves 39c that are formed on the front side of the grooves and extend vertically so as to connect the upper groove 39a and the lower groove 39b.

When the cellular phone is assembled, the second cabinet 2 is placed in the storage region R of the holding body 3 so as to insert the shaft parts 26 and 27 into the lower grooves 39b of the guide grooves 39, and the first cabinet 1 is placed on the second cabinet 2 in the storage region R of the holding body 3 so as to insert the protrusion parts 16 and 17 into the upper grooves 39a of the guide grooves 39.

Accordingly, the first cabinet 1 becomes slidable back and forth, guided by the upper grooves 39a. The second cabinet 2 becomes slidable back and forth, guided by the lower grooves 39b. When the second cabinet 2 moves forward and the shaft parts 26 and 27 reach the longitudinal grooves 39c, the second cabinet 2 becomes slidable up and down, guided by the longitudinal grooves 39c.

FIGS. 2(a) to 2(d) are diagrams for describing an operation for switching the cellular phone from a state in which the second cabinet 2 is closed to a state in which the second cabinet 2 is opened.

Figure 2:
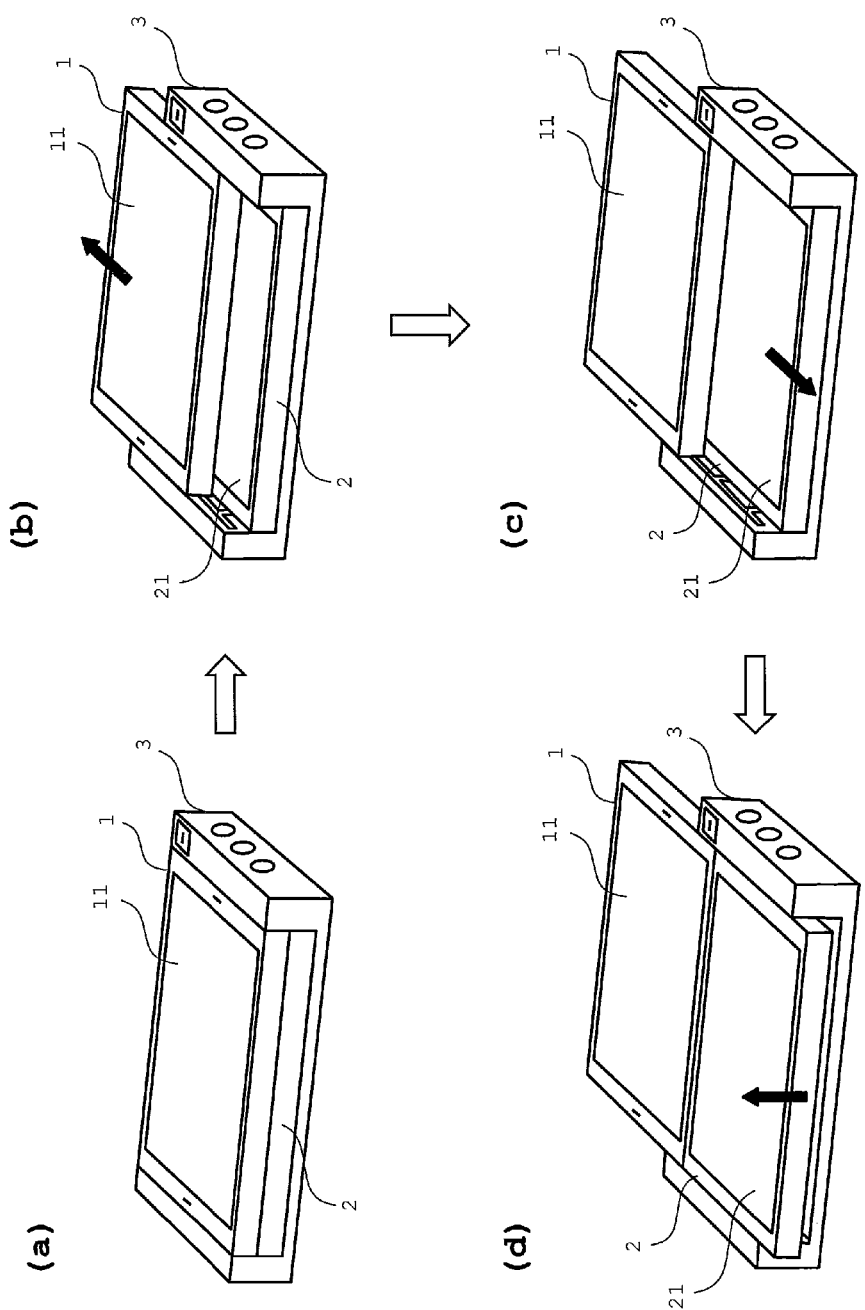
FIGS. 2(a) to 2(d) are diagrams for describing a switch operation for switching the cellular phone from a state in which a second cabinet is closed to a state in which the second cabinet is opened according to the embodiment.

In the initial state, as illustrated in FIG. 2(a), the second cabinet 2 is hidden behind the first cabinet 1. In this state (closed state), only the first display 11 is exposed to the outside. The switching operation is manually performed by the user.

First, as illustrated in FIG. 2(b), the user moves the first cabinet 1 backward (in a direction of an arrow). Then, when the movement of the first cabinet 1 to the back is completed, the user draws the second cabinet 2 forward as illustrated in FIG. 2(c). When the drawing operation causes the second cabinet 2 to move to a position where the second cabinet 2 is not laid over the first cabinet 1 at all, that is, a position where the second cabinet 2 is aligned on the front of the first cabinet 1, the shaft parts 26 and 27 fall in the longitudinal grooves 39c as described above, and thus the second cabinet 2 is pressed and raised by the coil springs 34. At this time, the magnet 14 and the magnet 23 attract each other to produce a further larger raising force. Accordingly, when the second cabinet 2 becomes fully opened (opened state), the first cabinet 1 and the second cabinet 2 align in a front-back direction so as to be attached to each other and flush with each other. Both the first display 11 and the second display 21 are exposed to the outside, and the two screens are integrated to form a large-sized screen.

In the following description, a state in which the second cabinet is closed, and out of the first display 11 and the second display 21, the first display 11 is exposed to the outside, refers to a first state. In addition, a state in which the second cabinet 2 is opened and both of the displays 11 and 21 are exposed to the outside, refers to a second state.

Figure 3:
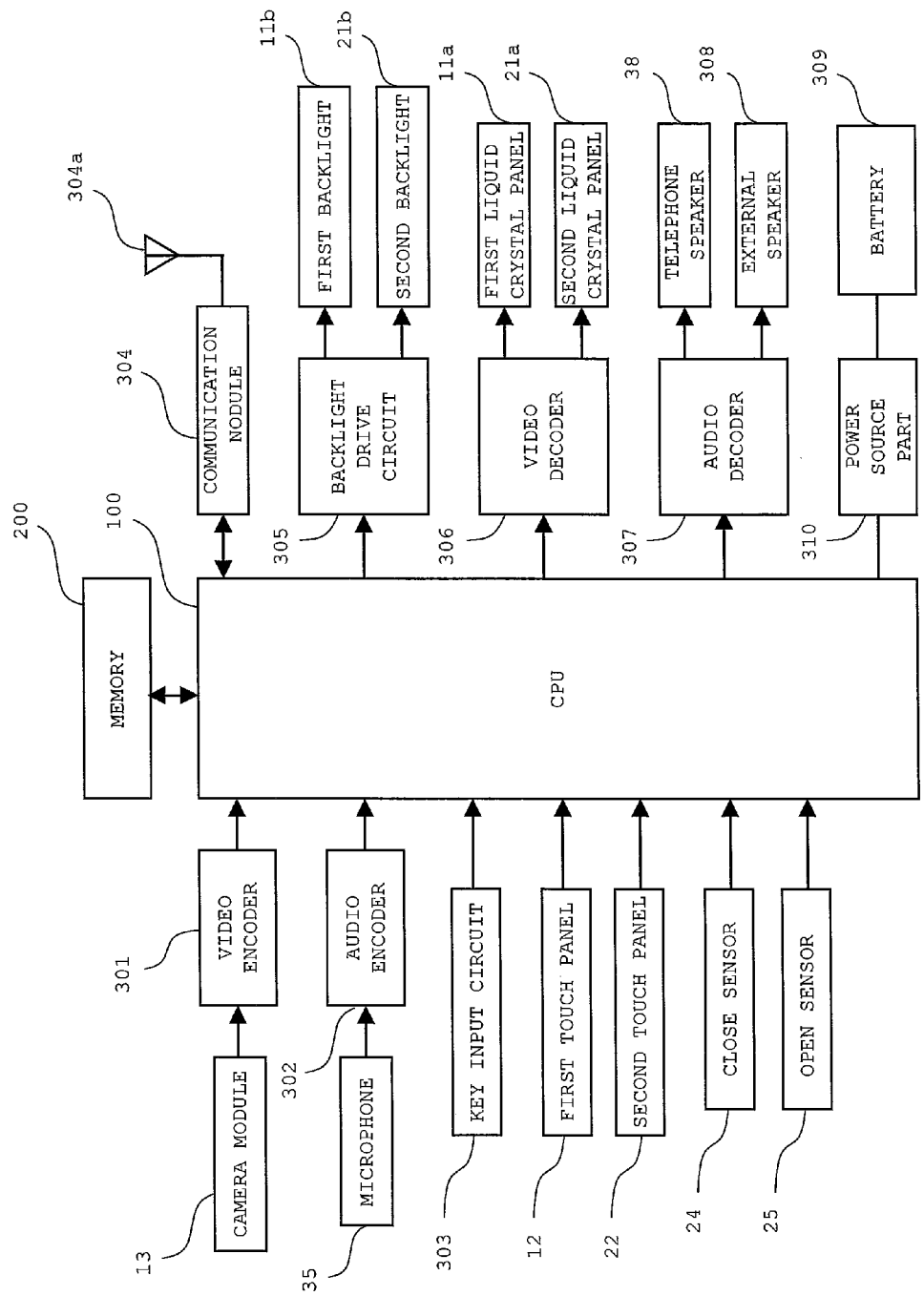
FIG. 3 is a block diagram showing an entire configuration of the cellular phone according to the embodiment.

FIG. 3 is a block diagram showing an entire configuration of the cellular phone. Besides the foregoing constituent elements, the cellular phone of the embodiment includes: a CPU 100, a memory 200, a video encoder 301, an audio encoder 302, a key input circuit 303, a communication module 304, a backlight drive circuit 305, a video decoder 306, an audio decoder 307, an external speaker 308, a battery 309, and a power source part 310.

The camera module 13 has an imaging element such as a CCD. The camera module 13 digitizes an image signal output from the imaging element, and subjects the image signal to various kinds of correction such as gamma correction, and then outputs the corrected signal to the video encoder 301. The video encoder 301 performs an encoding process on the image signal output from the camera module 13, and outputs the encoded signal to the CPU 100.

The microphone 35 converts collected sounds into an audio signal and outputs the signal to the audio encoder 302. The audio encoder 302 converts the analog audio signal from the microphone 35 into a digital audio signal, and performs an encoding process on the digital audio signal and outputs the encoded signal to the CPU 100.

When the power key 36 or any key of the operation key group 37 is operated, the key input circuit 303 outputs an input signal corresponding to the operated key, to the CPU 100.

The communication module 304 converts transmission data such as audio signals, image signals, and text signals from the CPU 100 into wireless signals, and then transmits the wireless signals to a base station via an antenna 304a. The communication module 304 converts wireless signals received via the antenna 304a to reception data such as audio signals, picture signals, and text signals, and then outputs the signals to the CPU 100.

The backlight drive circuit 305 supplies a voltage signal corresponding to a control signal from the CPU 100 to the first backlight 11b and the second backlight 21b. The first backlight 11b turns on according to the voltage signal from the backlight drive circuit 305 to illuminate the first liquid crystal panel 11a. The second backlight 21b turns on according to the voltage signal from the backlight drive circuit 305 to illuminate the second liquid crystal panel 21a.

The second backlight 21b may turn on when the closed cellular phone starts to open or when the cellular phone is brought into the opened state.

The video decoder 306 converts a video signal from the CPU 100 into an analog or digital video signal capable of being displayed on the first liquid crystal panel 11a and the second liquid crystal panel 21a, and outputs the converted signal to the liquid crystal panels 11a and 21a. The first liquid crystal panel 11a and the second liquid crystal panel 21a display images corresponding to the video signal (display screen) on respective display surfaces thereof.

The audio decoder 307 performs a decoding process on the audio signal from the CPU 100 and converts the audio signal into an analog audio signal, and then outputs the analog audio signal to the telephone speaker 38. The audio decoder 307 also performs a decoding process on sound signals for various notice sounds such as a ringtone and an alarm from the CPU 100, and further converts the sound signals into analog sound signals, and then outputs the analog sound signals to the external speaker 308. The telephone speaker 38 reproduces the audio signal from the audio decoder 307 as a sound. The external speaker 308 reproduces a ringtone or the like from the audio decoder 307.

The battery 309 is intended to supply power to the CPU 100 and components other than the CPU 100, and is formed by a secondary battery. The battery 309 is connected to the power source part 310.

The power source part 310 converts a voltage of the battery 309 into a voltage of a magnitude necessary for each of the components, and supplies the voltage to the components. The power source part 310 also charges the battery 309 by supplying power provided via an input part of an external power source (not shown) to the battery 309.

The memory 200 includes a ROM and a RAM. The memory 200 stores control programs for imparting control functions to the CPU 100.

The memory 200 also saves image data taken by the camera module 13, image data and text data (mail data) loaded from the outside via the communication module 304, and the like, in predetermined file formats.

The CPU 100 operates the camera module 13, the microphone 35, the communication module 304, the liquid crystal panels 11a and 21a, the telephone speaker 38, the external speaker 308, and the like, according to the control programs, based on operation input signals from the key input circuit 303 and the touch panels 12 and 22. Accordingly, the CPU 100 executes various applications for a telephone function, an e-mail function, and the like.

The CPU 100 also generates menu screens and operation screens for various applications to be shown on the displays 11 and 21 in a work area prepared in the memory 200, and outputs video signals for displaying these display screens.

<Functions of the Cellular Phone>

Figure 4:
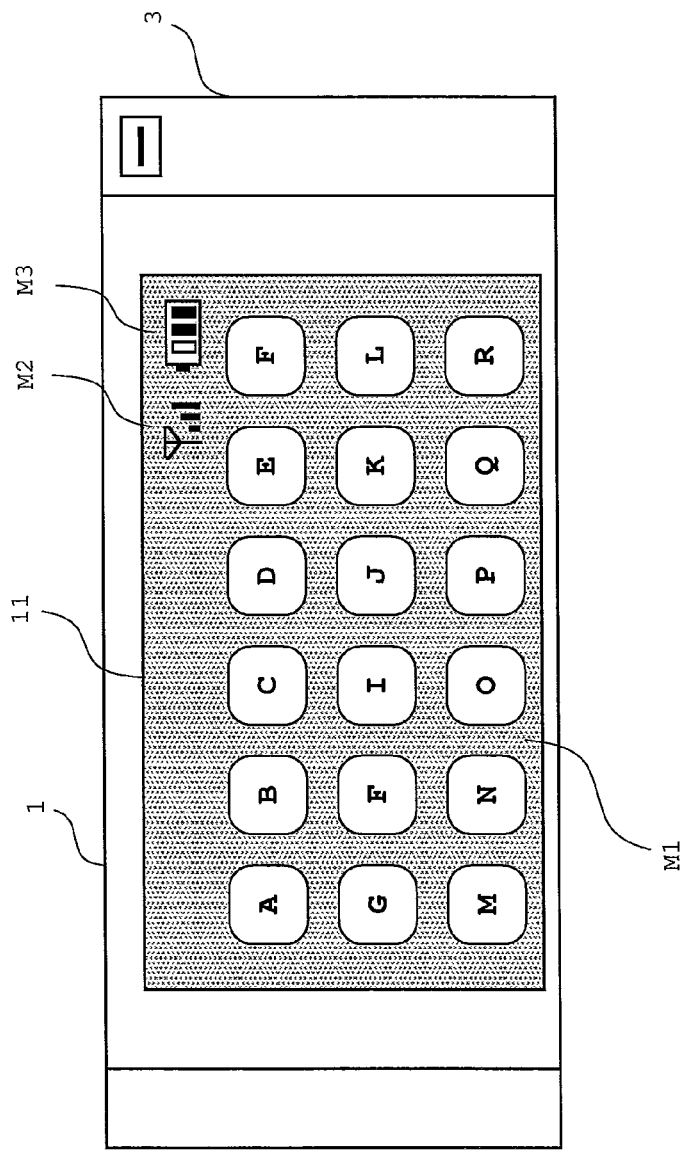
FIG. 4 is a diagram showing an example of a menu screen shown on a first display with the second cabinet in the closed state according to the embodiment.

FIG. 4 is a diagram showing an example of a menu screen shown on the first display 11 in the first state.

In the first state, the first display 11 shows the menu screen as an initial screen. The menu screen includes icons M1 for executing various applications as shown in FIG. 4, for example. The applications may be registered in advance or may be acquired by downloading via the Internet or the like. The acquired applications are installed and added to the cellular phone.

The first display 11 further includes an signal meter M2 indicative of a reception status and a remaining battery level mark M3 indicative of remaining battery level. The user can check the reception status by the signal meter M2 and check remaining battery level by the remaining battery level mark M3.

Of the icons M1 shown on the first display 11, the user can touch a desired icon M1 with a finger or the like to activate a desired application.

FIGS. 5(a) to 5(c) and FIGS. 6(a) and 6(b) are diagrams for describing display control on the first display 11 and the second display 21 on activation of applications. FIG. 7 is a diagram showing a transition state of screen display on execution of the control processes shown in FIGS. 5(a) to 5(c) and FIGS. 6(a) and 6(b).

FIG. 5(a) is a diagram showing a process flow of display control on execution of an operation for activating an application in the first state.

In the first state, the user selects a desired application (AP1) from the menu screen shown in FIG. 4, and touches with a finger or the like an icon M1 corresponding to the application (AP1).

Referring to FIG. 5(a), when the operation for activation is performed (S101: YES), the CPU 100 activates the application (AP1) for which the operation is performed, and generates an operation screen for the application (AP1). Then, the CPU 100 shows the generated operation screen on the first display 11 (S102).

As shown in FIG. 8, the memory 200 stores a correspondence table in which applications (AP1) to be activated on the first display 11 are associated with applications (AP2) to be activated on the second display 21.

In the correspondence table, applications likely to be used concurrently are associated with each other. For example, an application for a browser function is associated with an application for an e-mail function. In addition, an application for a telephone function is associated with an application for an address book. Further, not only entire applications but also partial functions of applications may be associated with each other. For example, a display screen for received mail is associated with an edit screen for reply mail.

The CPU 100 refers to the correspondence table in the memory 200, and if there is an application (AP2) associated with the activated application (AP1) (S103: YES), the CPU 100 activates the application (AP2) (S104). Then, the CPU 100 generates an operation screen for the application (AP2). However, the CPU 100 does not output a video signal for displaying the generated operation screen but turns off the second display 21 (S105).

Accordingly, as shown in (screen 1) of FIG. 7, the operation screen for the application (AP1) is shown on the first display 11. At that time, the second display 21 is turned off, but the application (AP2) is activated and the operation screen for the application is buffered in the memory 200.

The application (AP2) does not need to be quickly activated because the application (AP2) is not to be immediately shown on the second display 21. Therefore, at step S104, the CPU 100 activates the application (AP2) with a lower task priority than that at a normal activation. In the following description of another control process, on activation of an application (AP2) with the second cabinet 2 in the closed state, the application (AP2) is activated with a lower task priority as in the foregoing case.

FIG. 5(b) is a diagram showing a process flow of display control on switching from the first state to the second state.

When the user wishes to use another application on the second display 21 while the user uses an application on the first display 11, the user opens the second cabinet 2, for instance.

Referring to FIG. 5(b), when the second cabinet 2 is opened by the user, if an application (AP1) is under execution (S201: YES), the CPU 100 continuously shows the operation screen for the application (AP1) on the first display 11 (S202). Further, if an application (AP2) is under execution (S203: YES), the CPU 100 turns on the second display 21 and outputs a video signal to show the operation screen for the application (AP2) on the second display 21 (S204).

Accordingly, the state shown in (screen 1) of FIG. 7 changes to the state shown in (screen 2) of FIG. 7, whereby the first display 11 shows the operation screen for the application (AP1), and the second display 21 shows the operation screen for the application (AP2). At that time, the application (AP2) has been already activated and the operation screen for the application has been generated in the first state. Therefore, when the second cabinet 2 is opened, the operation screen for the application (AP2) is quickly shown on the second display 21.

If the application shown on the second display 21 is to be used, the user uses the application as it is. Meanwhile, if another application is to be used, the user terminates the application under execution and activates the other application.

FIG. 5(c) is a diagram showing a process flow of display control on switching from the second state to the first state.

If an application under execution on the second display 21 is to be ended or temporarily stopped, for example, the user closes the second cabinet 2.

Referring to FIG. 5(c), when the second cabinet 2 is closed by the user, if an application (AP1) is under execution (S301: YES), the CPU 100 continuously shows the operation screen for the application (AP1) on the first display 11 (S302). Further, if an application (AP2) is under execution on the second display 21 (S303: YES), the CPU 100 turns off the second display (S305) while continuing the execution of the application (AP2) (S304).

Accordingly, the state shown in (screen 2) of FIG. 7 changes to the state shown in (screen 1) of FIG. 7, whereby the first display 11 shows the operation screen for the application (AP1). At that time, since the execution of the application (AP2) is continued, the operation screen for the application is buffered in the memory 200. If the second cabinet 2 is opened again in this state, the control process shown in FIG. 5(b) is performed and the operation screen for the application (AP2) is quickly shown on the second display 21.

In the second state, if the application (AP2) is not executed (S203: NO), the CPU 100 turns off the second display 21 in the state where the application (AP2) is stopped.

Figure 6:
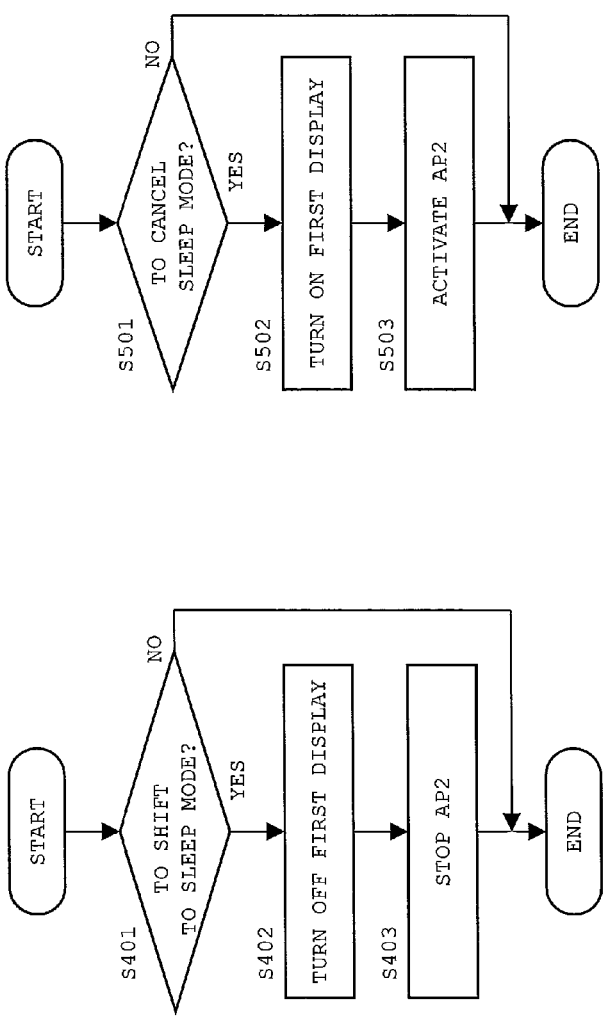
FIGS. 6(a) and 6(b) are diagrams for describing display control on the first display and the second display on activation of an application according to the embodiment.
Figure 6:
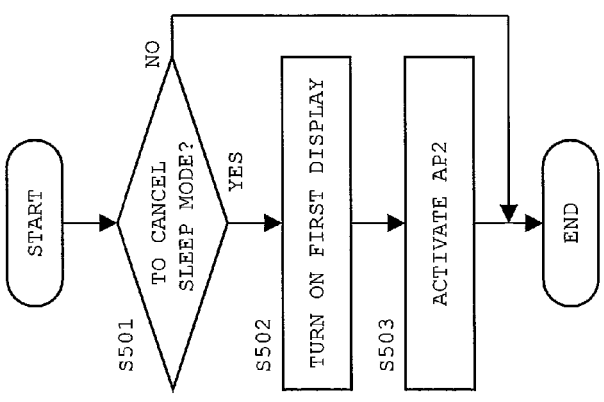
Figure 7:
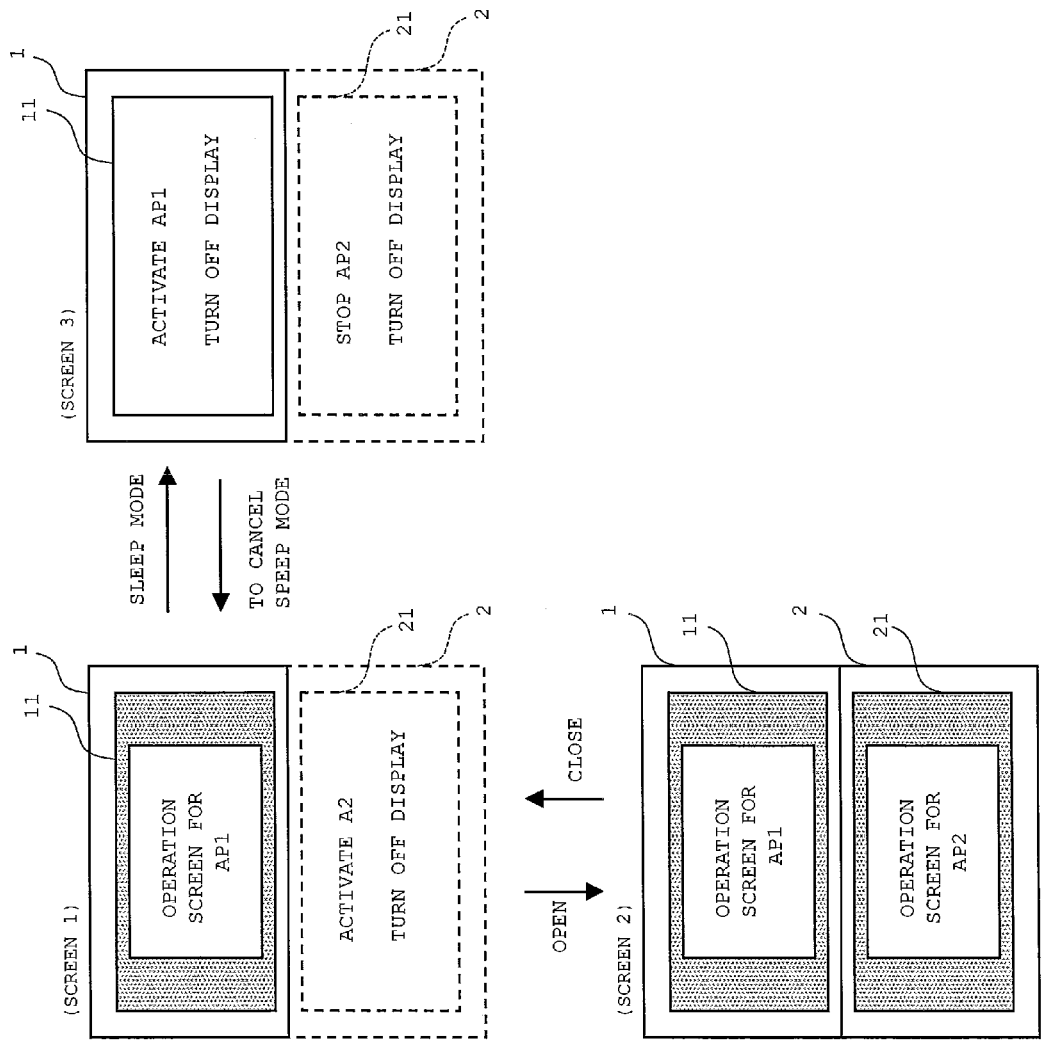
FIG. 7 is a diagram showing a transition state of screen display on execution of control processes shown in FIGS. 5(a) to 5(c) and FIGS. 6(a) and 6(b) according to the embodiment.

FIGS. 6(a) and 6(b) are diagrams showing process flows of display control in relation to a sleep mode in the first state. In the first state, when no input operation is performed with respect to the application (AP1) under execution on the first display 11, screen display enters the sleep mode.

Referring to FIG. 6(a), if no input operation following the previous input operation is performed even after elapse of a predetermined period of time and thus screen display shifts to the sleep mode (S401: YES), the CPU 100 turns off the first display 11 while continuing the execution of the application (AP1) (S402). Further, the CPU 100 stops the application (AP2) (S403).

Accordingly, the state shown in (screen 1) of FIG. 7 changes to the state shown in (screen 3) of FIG. 7, whereby the first display 11 does not show the operation screen for the application (AP1) anymore.

In the sleep mode, the first display 11 is turned off and the application (AP2) is stopped, which significantly reduce power consumption of the cellular phone.

To resume an input operation, the user first performs an operation for cancelling the sleep mode. For example, out of the operation key group 37, the user presses a key allocated in advance to a cancellation operation.

Referring to FIG. 6(b), if the sleep mode is canceled (S501: YES), the CPU 100 turns on the first display 11 to show the operation screen for the application (AP1) on the first display 11 (S502). Further, the CPU 100 activates again the stopped application (AP2) while keeping the second display 21 in the off state, and generates the operation screen for the application.

Accordingly, the state shown in (screen 3) of FIG. 7 changes to the state shown in (screen 1) of FIG. 7, whereby the first display 11 shows again the operation screen for the application (AP1). At that time, the application (AP2) is activated again and the operation screen for the application is buffered in the memory 200. If the second cabinet 2 is opened again in this state, the process shown in FIG. 5(b) is performed and the operation screen for the application (AP2) is quickly shown on the second display 21.

As in the foregoing, in the embodiment, before the second cabinet 2 is opened, the application (AP2) to be shown on the second display 21 is activated and the operation screen for the application is prepared in the memory 200. Accordingly, it is possible to, when the second cabinet 2 is opened, quickly show the operation screen for the application (AP2) on the second display 21 and allow the user to smoothly shift to use of the application (AP2). In addition, when the second cabinet 2 is closed, the second display 21 is turned off to reduce wasteful power consumption.

In addition, the embodiment is configured to activate an application (AP2) associated with an application (AP1) activated on the first display 11. Therefore, the application (AP2) which is likely to be used concurrently with the application (AP1), can be associated with the application (AP1) to thereby enhance convenience for the user.

Further, in the embodiment, when an input operation with respect to an application (AP1) is stopped, screen display enters the sleep mode. In the sleep mode, the application (AP2) activated in the background is stopped. That is, in the situation where the user is unlikely to shift to use of the application (AP2), the application (AP2) is stopped to thereby further suppress wasteful power consumption.

Moreover, in the embodiment, when the sleep mode is cancelled, the application (AP2) is activated again. That is, in the situation where the user is likely to shift to use of the application (AP2), the application (AP2) is activated again. Therefore, when screen display enters the second state, it is possible to quickly show the operation screen for the application (AP2) on the second display 21.

Figure 9:
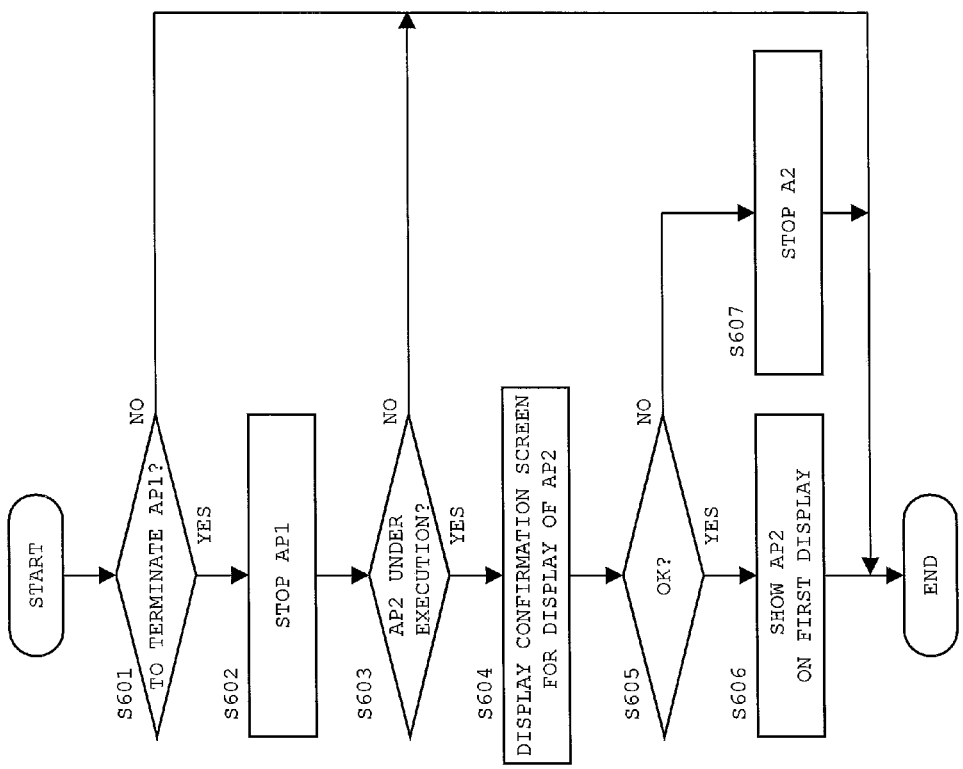
FIG. 9 is a diagram showing a process flow of display control on termination of an application (AP1) on the first display with the second cabinet in the closed state according to the embodiment.
Figure 10:
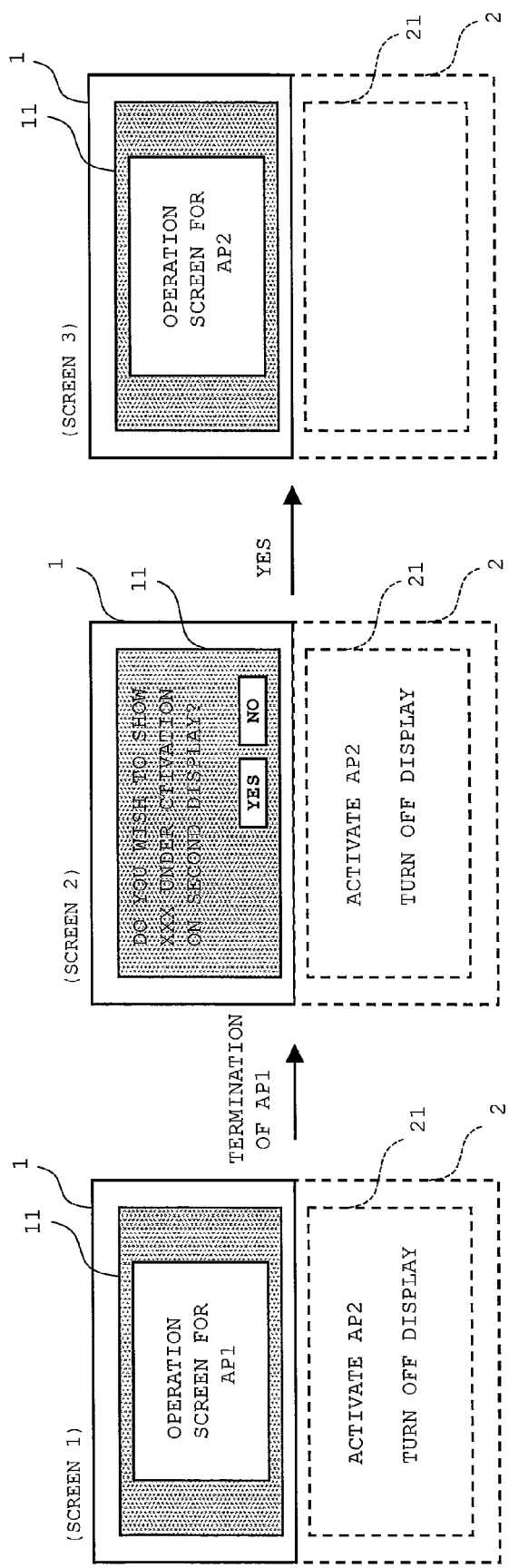
FIG. 10 is a diagram showing a transition state of screen display on execution of the control process shown in FIG. 9 according to the embodiment.

FIG. 9 is a diagram showing a process flow of display control at termination of an application (AP1) on the first display 11 in the first state. FIG. 10 is a diagram showing a transition state of screen display on execution of the control process shown in FIG. 9.

As shown in (screen 1) of FIG. 10, when the operation screen for an application (AP1) is shown on the first display 11 and an application (AP2) is executed in the background, the user may terminate the application (AP1) and close the operation screen for the application.

Referring to FIG. 9, when an operation for terminating the application (AP1) is performed (S601: YES), the CPU 100 stops the application (AP1) (S602). Accordingly, the operation screen for the application (AP1) is closed on the first display 11.

Next, the CPU 100 determines whether an application (AP2) is under execution (S603). If the application (AP2) is under execution (S603: YES), the CPU 100 shows on the first display 11a confirmation screen for allowing the user to confirm whether to show the operation screen for the application (AP2) on the first display 11 (S604). The confirmation screen may be a display screen as shown in (screen 2) of FIG. 10, for example. If the operation screen for the application (AP2) is to be shown on the first display 11, the user presses a "YES" key on the confirmation screen. If the operation screen for the application (AP2) is not to be shown, the user presses a "NO" key.

When an operation for permitting display is performed (S605: YES), the CPU 100 shows the operation screen for the application (AP2) on the first display 11 as shown in (screen 3) of FIG. 10 (S606). In contrast, when an operation for not permitting display is performed (S605: NO), the CPU 100 stops the application (AP2) (S607).

As in the foregoing, in the embodiment, it is constructed that, if an application (AP2) is under execution in the background when an application (AP1) under execution on the first display 11 is terminated, the operation screen for the application (AP2) will be shown on the first display 11 at termination of the application (AP1). Accordingly, the user can refer to the operation screen for the application (AP2) on the first display 11 and shift to use of the application (AP2) as appropriate.

Further, the operation screen for the application (AP2) is not shown on the first display 11 without the user's permission, and thus no undesired display is preformed.

If no application (AP2) is under execution (S603: NO) or the application (AP2) is stopped (S607), the menu screen is shown on the first display 11, for example.

In the foregoing configuration, if it is determined at step S603 that an application (AP2) is under execution, the confirmation screen is displayed. Alternatively, screen display may be configured such that the confirmation screen is not shown but the operation screen for the application (AP2) is immediately shown on the first display 11. In this case, screen display on the first display 11 changes directly from (screen 1) to (screen 3) of FIG. 10. If the application (AP2) shown on the first display 11 is not to be used, the user can terminate the application (AP2).

Figure 11:
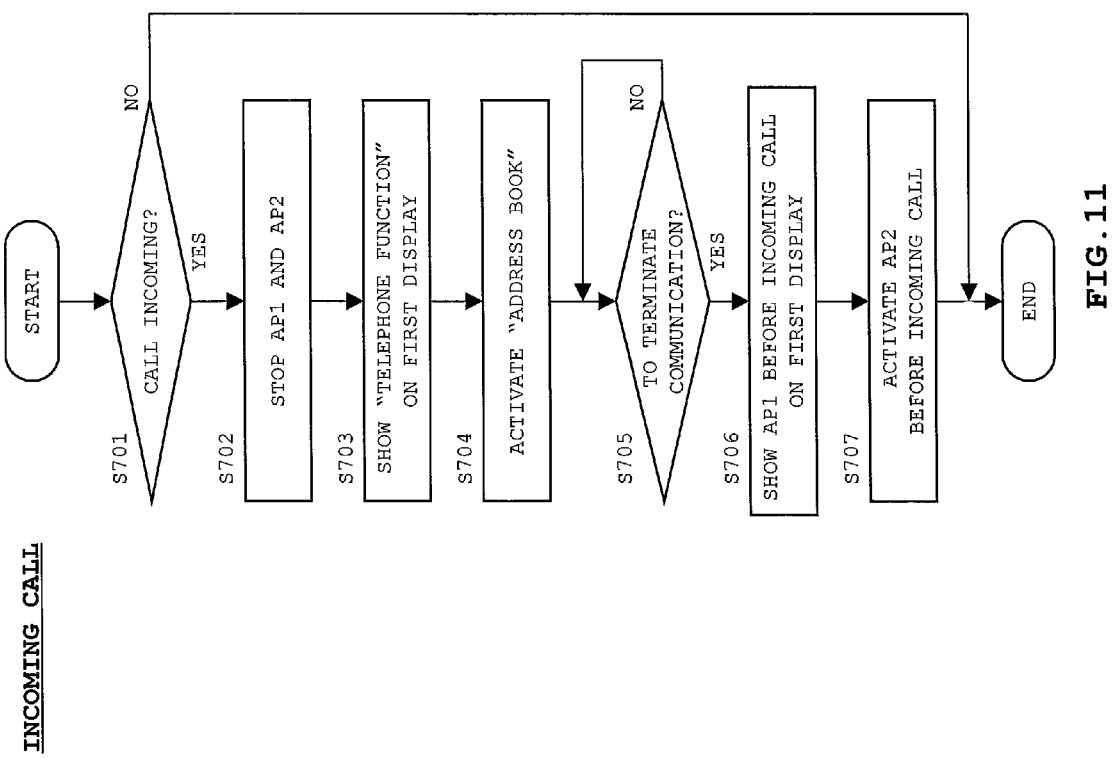
FIG. 11 is a diagram showing a process flow of display control when an incoming call arrives with the second cabinet in the closed state according to the embodiment.
Figure 12:
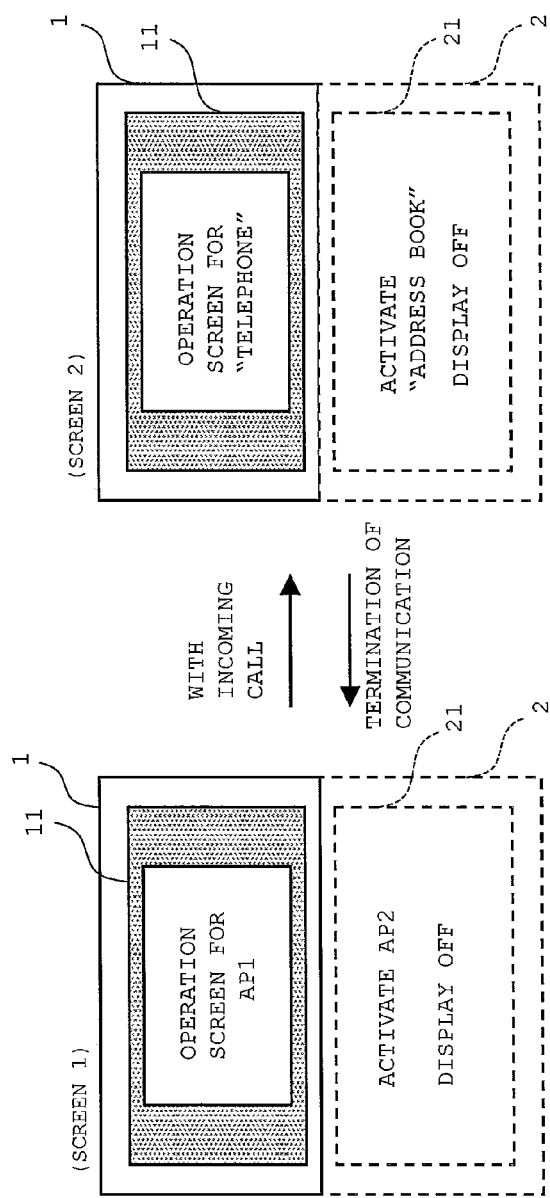
FIG. 12 is a diagram showing a transition state of screen display on execution of the control process shown in FIG. 10 according to the embodiment.

FIG. 11 is a diagram showing a process flow of display control when an incoming call arrives in the first state. FIG. 12 is a diagram showing a transition state of screen display on execution of the control process shown in FIG. 11.

As shown in (screen 1) of FIG. 12, when the operation screen for an application (AP1) is shown on the first display 11 and an application (AP2) is executed in the background in the first state, there may be an incoming call.

Referring to FIG. 11, if there is an incoming call (S701: YES), the CPU 100 stops the application (AP1) and the application (AP2) (S702). When the application (AP1) is stopped, the operation screen immediately before the stoppage is saved in the memory 200.

Next, the CPU 100 activates the application for a telephone function, and shows an operation screen for the telephone function, that is, a calling screen, on the first display 11 as shown in (screen 2) of FIG. 12 (S703). Further, the CPU 100 refers to the correspondence table, and activates an application associated with the application for a telephone function, for example, an application for an address book, and then generates an operation screen for the application (S704).

Figure 5:
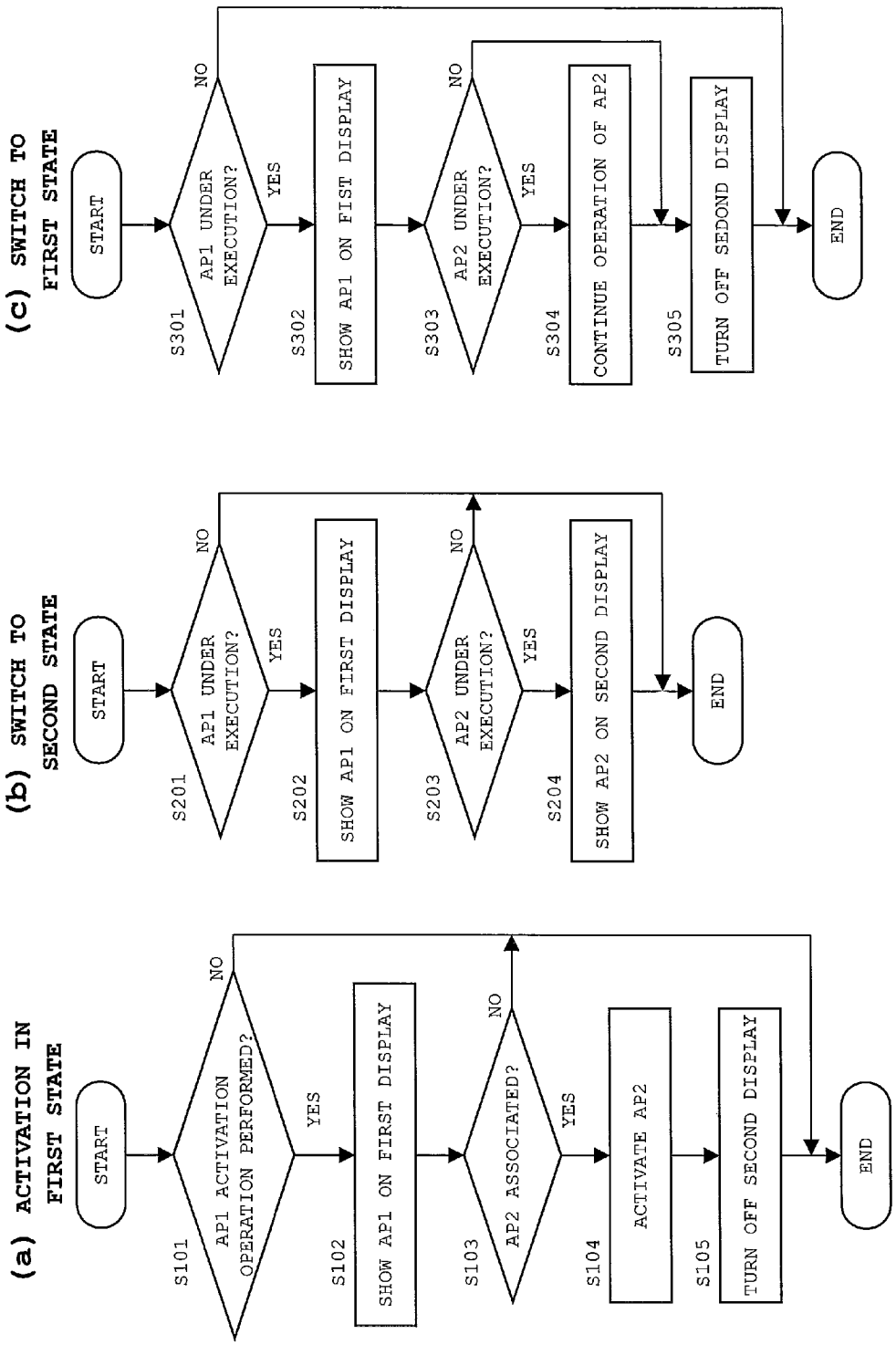
FIGS. 5(a) to 5(c) are diagrams for describing display control on the first display and the second display on activation of applications according to the embodiment.

When the second cabinet 2 is opened by the user in this state, the control process shown in FIG. 5(*b*) is performed and the operation screen for the application for an address book is quickly shown on the second display 21. The user can conduct communications while viewing information about the other end of the communications (telephone number, address, and the like) on the address book.

When the user ends communications and performs an operation for stoppage of communications in the first state (S705: YES), the CPU 100 activates again the application (AP1) having been under execution before the incoming call arrived. Then, the CPU 100 regenerates the operation screen saved in the memory 200 immediately before the stoppage, and shows the operation screen on the first display 11 (S706). Further, the CPU 100 activates the application (AP2) having been under execution before the incoming of the call while keeping the second display 21 in the off state, and then regenerates the operation screen for the application (S707).

As in the foregoing, in the embodiment, the user can switch the screen display to the second state as appropriate during communications to quickly show the operation screen for an application (AP2) corresponding to the application for a telephone function, for example, the operation screen for the application for an address book. This enhances convenience for the user.

Further, after the end of communications, screen display returns to the display mode before the incoming call, which allows the user to use continuously the application (AP1) and the application (AP2) used before the incoming call has arrived.

MODIFICATION EXAMPLE 1

Figure 13:
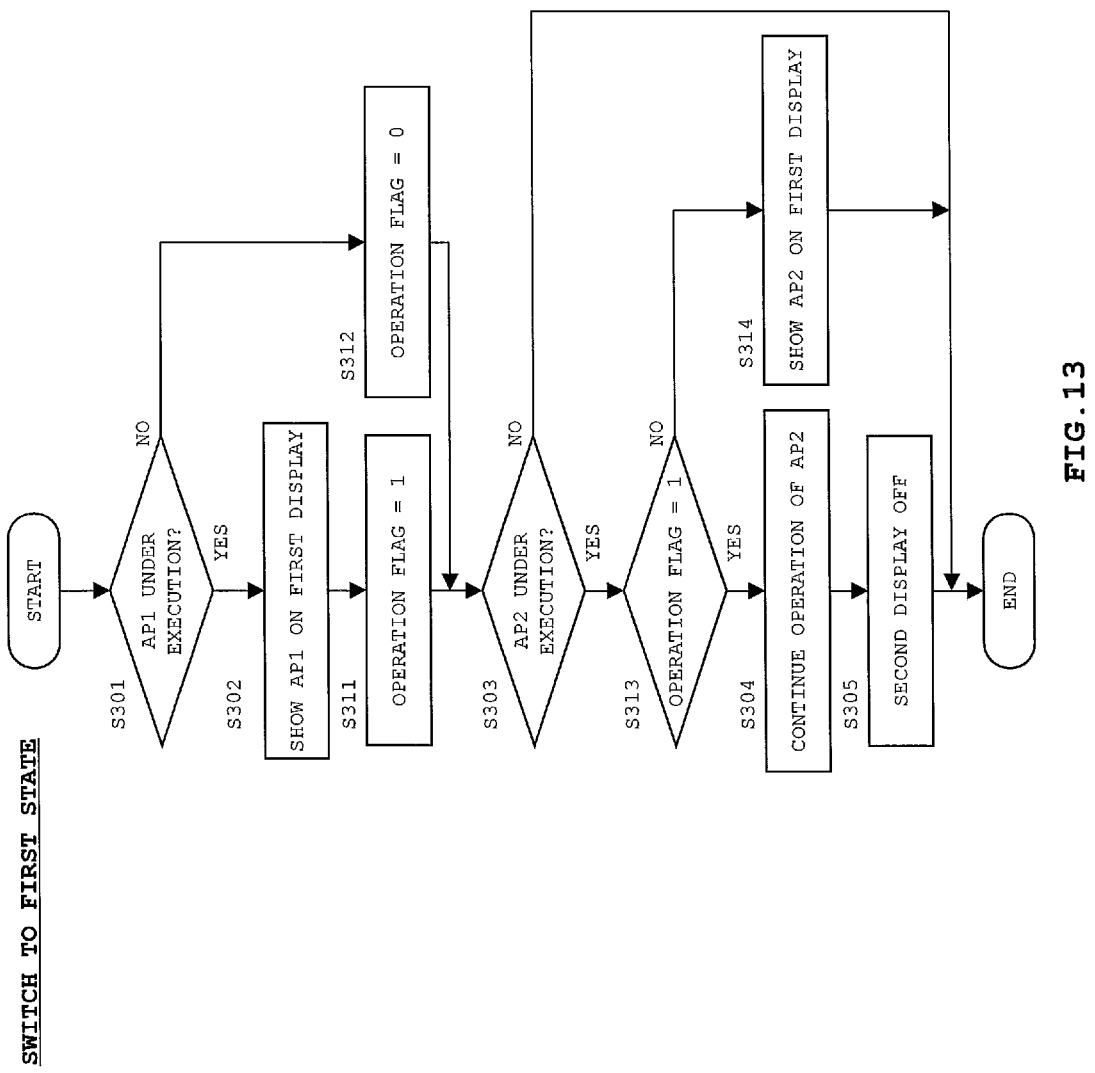
FIG. 13 is a diagram showing a process flow of display control on switching of the second cabinet from the opened state to the closed state according to modification example 1.
Figure 14:
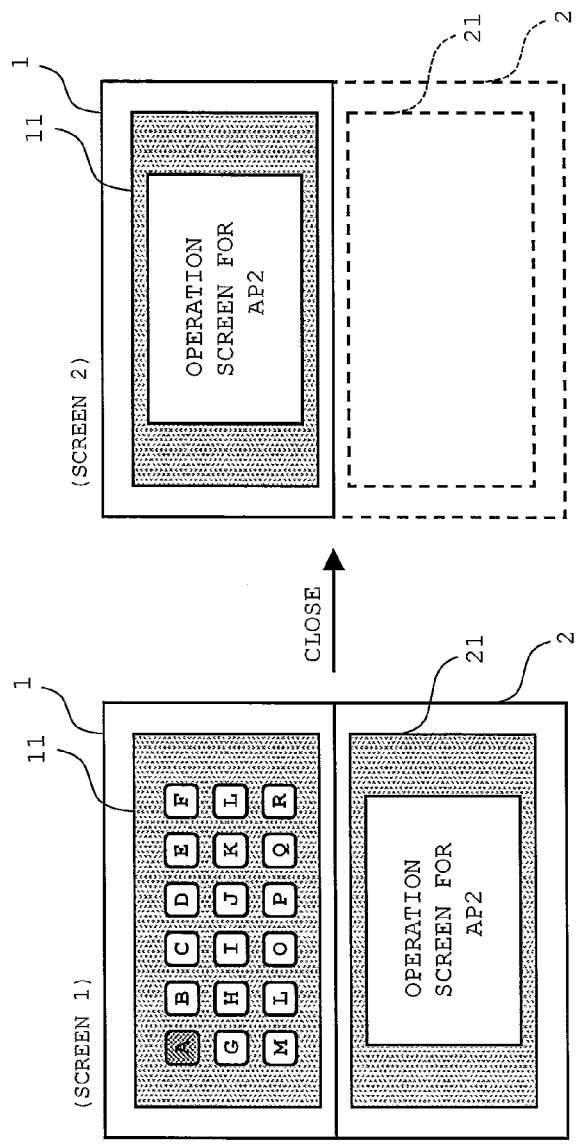
FIG. 14 is a diagram showing a transition state of screen display on execution of the control process shown in FIG. 13 according to modification example 1.

FIG. 13 is a diagram showing a process flow of display control on switching from the second state to the first state according to modification example 1. FIG. 14 is a diagram showing a transition state of screen display on execution of the control process shown in FIG. 13.

In the foregoing embodiment, in the control process shown in FIG. 5(*c*), if no application (AP1) is under execution when the second cabinet 2 is closed (S301: NO), that is, if the first display 11 returns to the menu screen as shown in FIG. 14, for example, the process is directly terminated. In this case, another control process is performed, for example, the menu screen is shown on the first display 11, and the application (AP2) is stopped. Alternatively, the control process shown in FIG. 5(*c*) may be modified as in the modification example.

Referring to FIG. 13, if an application (AP1) is under execution (S301: YES), the CPU 100 continuously shows the operation screen for the application on the first display 11 (S302), and then sets an operation flag (S311). The operation flag is a flag for determining whether an application (AP1) is under execution or not.

In contrast, if no application (AP1) is under execution (S301: NO), the CPU 100 resets the operation flag (S312).

After that, if an application (AP2) is under execution, the CPU 100 checks the operation flag (S313). If the operation flag is reset (S313: NO), the CPU 100 shows the operation screen for the application (AP2) on the second display 21 (S314), as shown in (screen 2) of FIG. 14.

In the foregoing configuration, when screen display is switched to the first state, the user can use the application (AP2) as appropriate.

Alternatively, if the operation flag is reset, a process similar to steps S604 to S607 shown in FIG. 9 may be performed. Specifically, if the confirmation screen is shown to prompt the user for confirmation and then a permission of display is provided by the user, the operation screen for the application (AP2) may be shown on the first display 11.

MODIFICATION EXAMPLE 2

Figure 15:
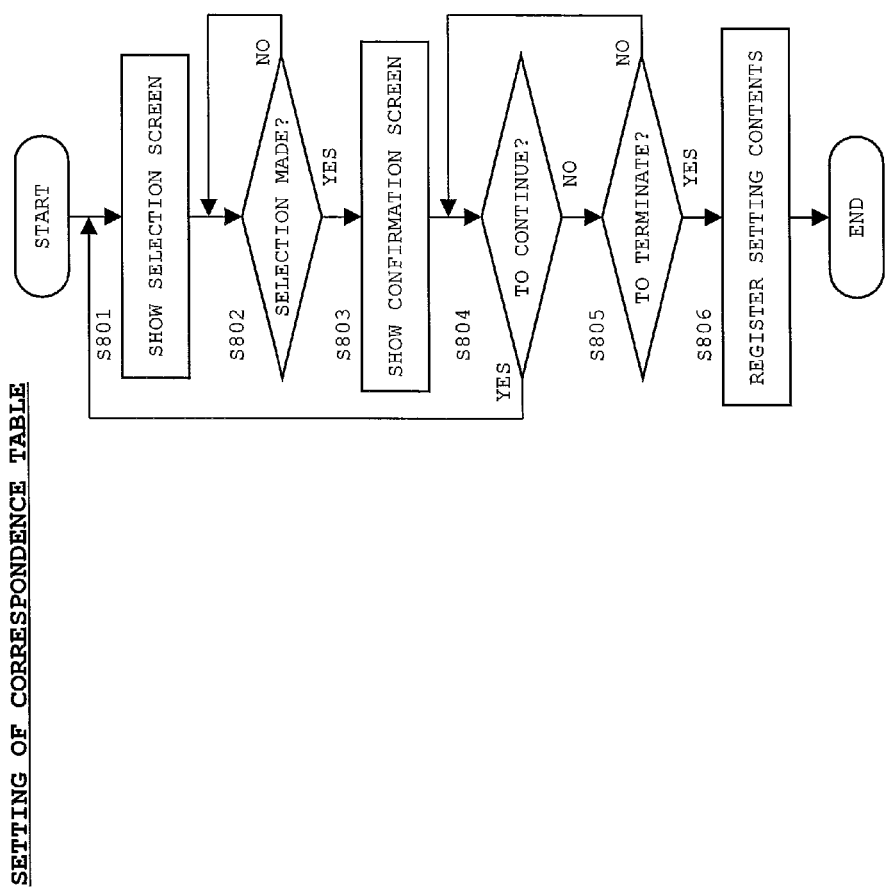
FIG. 15 is a diagram showing a process flow of control for setting the correspondence table according to modification example 2.
Figure 16:
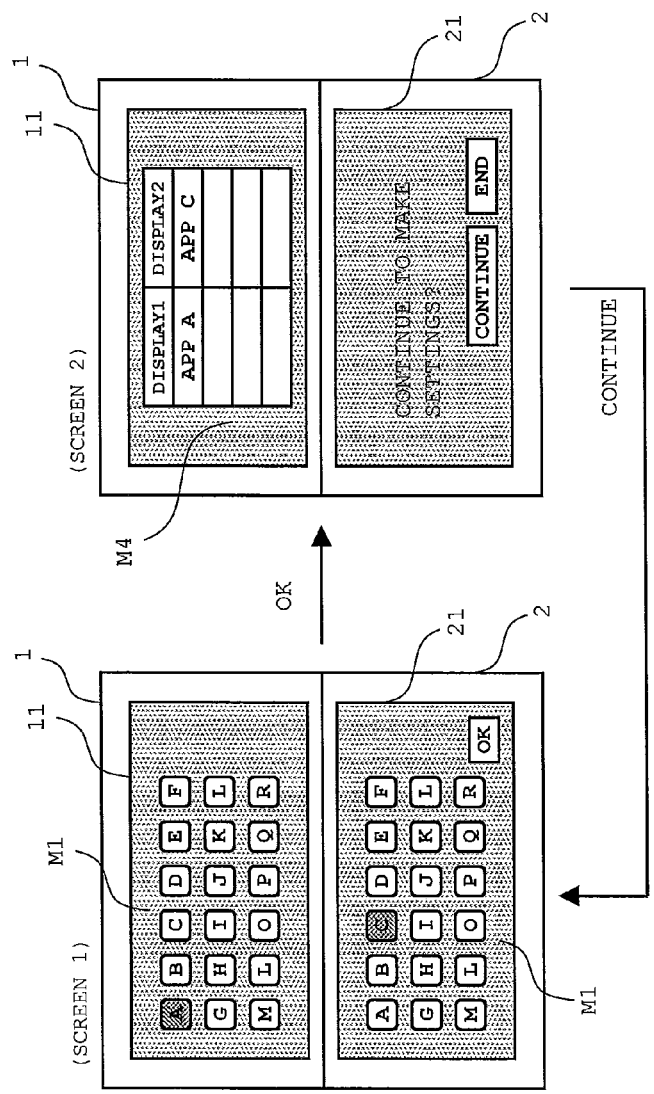
FIG. 16 is a diagram showing a transition state of screen display on execution of the control process shown in FIG. 15 according to modification example 2.
Figure 17:
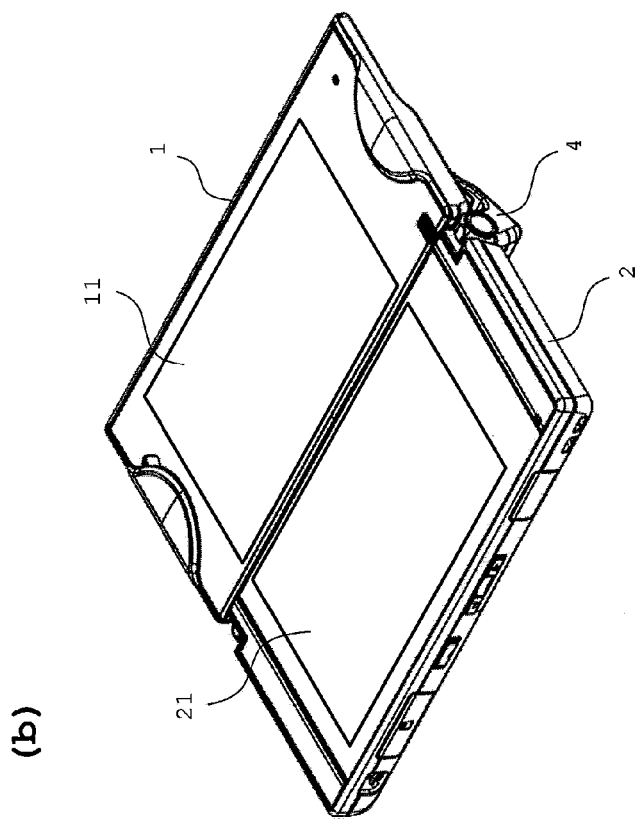
FIGS. 17(a) and 17(b) are diagrams for describing a configuration of a cellular phone according to another modification example.
Figure 17:
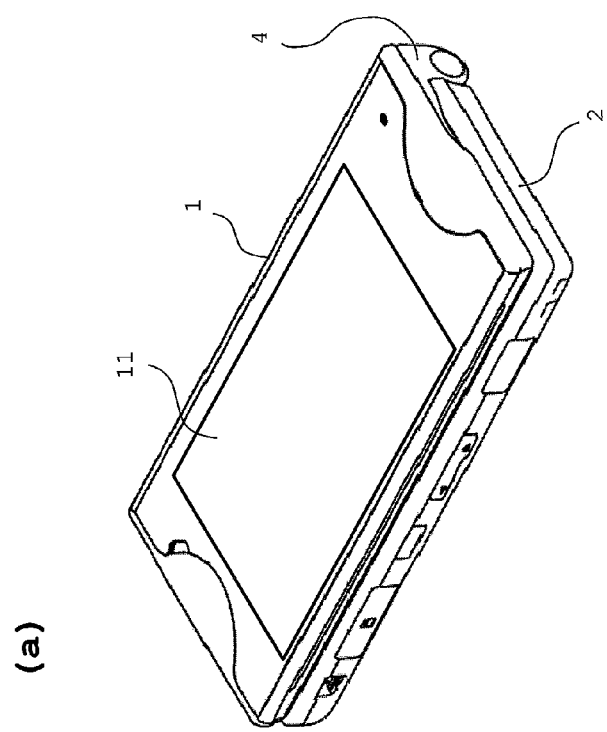

FIG. 15 is a diagram showing a process flow of control for setting the correspondence table according to modification example 2. FIG. 16 is a diagram showing a transition state of screen display on execution of the control process shown in FIG. 15.

In the foregoing embodiment, the contents of the correspondence table are set in advance. Alternatively, the contents of the correspondence table may be arbitrarily set by the user as in the modification example.

The correspondence table is set using both of the displays 11 and 12. When an operation for setting the correspondence table is performed in the second state, the control process shown in FIG. 15 is started.

Referring to FIG. 15, the CPU 100 first shows a selection screen as shown in (screen 1) of FIG. 16 on both of the displays 11 and 12. The displays 11 and 12 show selectable icons M1.

The user selects on the first display 11 an icon M1 for an application (AP1) to be activated on the first display 11. Then, the user selects on the second display 21 an icon M1 for an application (AP2) to be activated on the second display 21 corresponding to the selected application (AP1). Upon completion of the selection of icons M1 on each of the displays 11 and 12, the user presses an "OK" key.

When the "OK" key is pressed by the user, the CPU 100 determines that the selection is completed (S802: YES), and shows a confirmation screen as shown in (screen 2) of FIG. 16 on both of the displays 11 and 12. The first display 11 shows a correspondence table M4, and the second display 21 shows a display screen for allowing the user to perform an operation for continuing or terminating the setting.

The user checks the current setting status on the first display 11, and if the setting is to be continued, the user presses a "Continue" key. If the operation for continuing the setting is performed (S804: YES), the CPU 100 shows again the selection screen on both of the displays 11 and 12 (S801).

Meanwhile, upon completion of all the settings, the user presses an "End" key. If the operation for terminating the setting is performed (S805: YES), the CPU 100 registers the setting contents of the correspondence table in the memory 200 (S806), and then terminates the process.

In the foregoing configuration, the user can activate a desired application (AP2) on the second display 21, which further enhances convenience for the user.

If a preset standard correspondence table is separately prepared and no correspondence table is set by the user, the standard correspondence table may be referred to. In addition, the standard correspondence table may be referred to if an application (AP1) not included in the correspondence table set by the user is activated on the first display 11.

Others

As in the foregoing, the embodiment of the present invention is described, but the present invention is not limited to by the foregoing embodiment. In addition, the embodiment of the present invention can be modified in various manners besides the foregoing ones.

For example, in the foregoing embodiment, upon a shift to the sleep mode, the first display 11 is immediately turned off. However, the present invention is not limited to this but may be configured such that, upon a shift to the sleep mode, the first backlight 11b is first lowered in brightness, and after that, if no input operation is performed during a specific period of time, the first display 11 is turned off. In this case, an application (AP2) may be stopped at a timing when the first display 11 is turned off or at a timing when the first backlight 11b is lowered in brightness. Alternatively, screen display may be shifted to the sleep mode when a predetermined shift operation is performed by the user.

In the modification example 2, the user can set the correspondence table. However, in place of or in addition to this, the correspondence table may be set in a manner described below. Specifically, the memory saves the records of applications concurrently used on the two displays 11 and 21 in the second state, and if the number (frequency) of concurrent use exceeds a predetermined value, the two applications may be set in the correspondence table.

Further, in the foregoing embodiment, one application (AP2) is associated with an application (AP1) executed on the first display 11. Alternatively, a plurality of applications (AP2) may be associated with an application (AP1). In this case, when the operation screen for the application (AP1) is shown on the first display 11, the plurality of applications (AP2) is activated in the background. Then, if screen display switches to the second state, these applications (AP2) are first shown as candidates for selection on the second display 21. When the user selects a desired application (AP2) from the plurality of candidates, the selected application (AP2) is shown on the second display 21.

Further, in the foregoing embodiment, the first cabinet 1 and the second cabinet 2 are held by the holding body 3 so as to be capable of being opened or closed. However, the present invention is not limited to this arrangement. For example, both of the cabinets 1 and 2 may be coupled together by a coupling part 4 as shown in FIGS. 17(a), 17(b) and FIGS. 18(a) 18(b).

The coupling part 4 couples the two cabinets 1 and 2 such that the cellular phone can be switched between the closed state and the opened state. In the closed state, of the two displays 11 and 21, only the first display 11 is exposed to the outside (see FIG. 17(a)). Meanwhile, in the opened state, the two displays 11 and 21 are exposed to the outside and aligned in an approximately horizontal position (see FIG. 17(b)).

Figure 18:
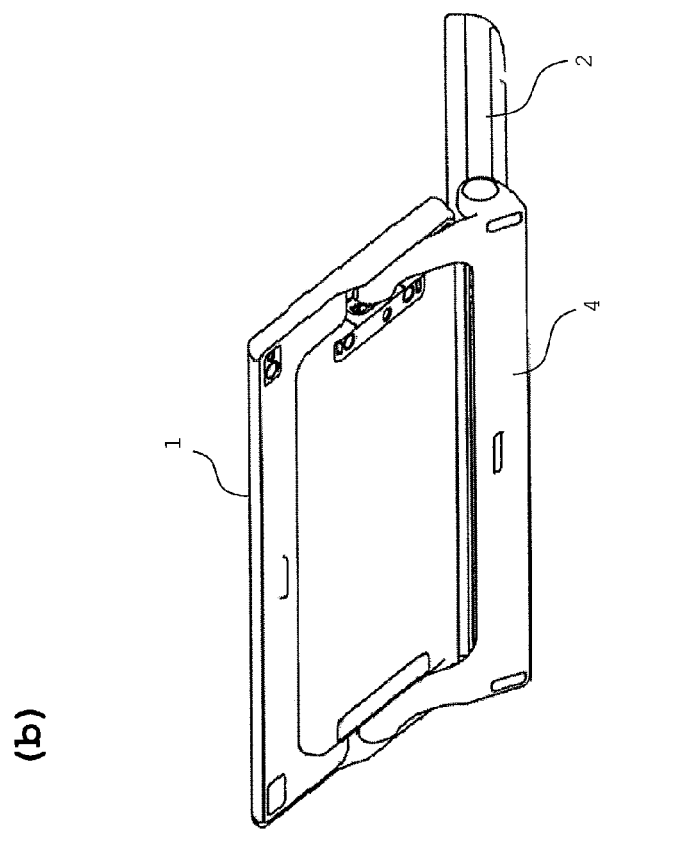
FIGS. 18(a) and 18(b) are diagrams for describing a configuration of a cellular phone according to still another modification example.
Figure 18:
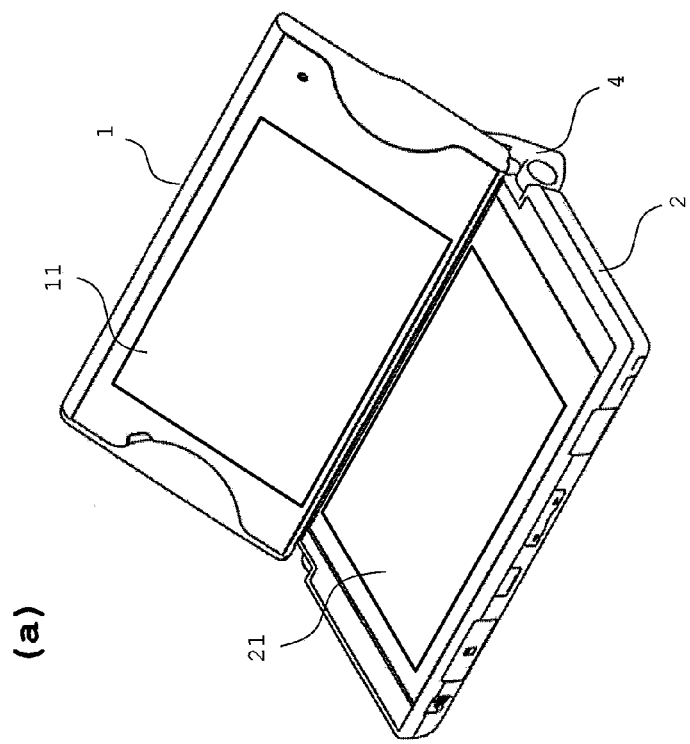

In addition, the coupling part 4 couples the two cabinets 1 and 2 such that the first cabinet 1 is held so as to be inclined at a predetermined angle (tilt state) with respect to the second cabinet 2, as shown in FIGS. 18(a) and 18(b).

Further, the mobile terminal device of the present invention is not limited to a cellular phone, but may be a PDA (personal digital assistant) or the like.

Besides, the embodiment of the present invention can be modified as appropriate in various manners within the scope of technical ideas recited in the claims.

REFERENCE SIGNS LIST

11 First display
14 Magnet
16 Protrusion part
17 Protrusion part
21 Second display
23 Magnet
26 Shaft part
27 Shaft part
34 Coil spring
39 Guide groove
100 CPU
200 Memory

The invention claimed is:

1. A mobile terminal device comprising:
a first display module comprising a first display;
second display module comprising a second display;
a switch mechanism configured to switch the first display module and the second display module between a closed state, in which the first display is exposed and the second display module is not exposed, and an open state in which both the first display and the second display are exposed; and
a controller configured to, while the first and display modules are in the closed state,
receive a user selection of a first application, and
in response to the user selection,
activate the first application, generate a first operation screen for the first application, and display the first operation screen on the first display, and
automatically activate a second application associated with the first application, generate a second operation screen for the second application, but not display the second operation screen on any of the first and second displays.

2. The mobile terminal device according to claim 1, comprising a memory that stores a correspondence table which associates the first application and the second application.

3. The mobile terminal device according to claim 2, wherein the controller is further configured to receive a user-specified association between two or more applications, and store the association in the correspondence table.

4. The mobile terminal device according to claim 3, wherein receiving a user-specified association between two or more applications comprises:
displaying, on the first display, a first plurality of selectable icons for a plurality of applications;
displaying, on the second display, a second plurality of selectable icons for a plurality of applications;
receiving a user selection of one of the first plurality of selectable icons corresponding to one of the two or more applications; and
receiving a user selection of one of the second plurality of selectable icons corresponding to another one of the two or more applications.

5. The mobile terminal device according to claim 2, wherein the controller is further configured to:
record a number of times that a set of two or more applications are used concurrently; and,
when the number of times exceeds a predetermined value, store an association between the two or more applications in the correspondence table.

6. The mobile terminal device according to claim 2, wherein the controller is further configured to, in response to the user selection, identify the second application associated with the first application based on the correspondence table.

7. The mobile terminal device according to claim 1, wherein the controller is further configured to, while the first and second display modules are in the closed state and when no input operation is performed with respect to the first application for a predetermined period of time keep the first application activated while deactivating the second application.

8. The mobile terminal device according to claim 7, wherein the controller is further configured to, when an input operation is resumed after the second application has been deactivated, reactivate the second application.

9. The mobile terminal device according to claim 1, wherein the controller is further configured to, while the first and second display modules are in the closed state, when the first application is deactivated, display the second operation screen on the first display module.

10. The mobile terminal device according to claim 1, wherein the controller is further configured to, when there is an incoming call:
    display an operation screen for an application for a telephone function on the first display; and
    automatically activate an application that is associated with the application for the telephone function.

11. The mobile terminal device according to claim 10, wherein the controller is further configured to, when the application for the telephone function is deactivated, redisplay the operation screen for the first application on the first display, and reactive the second application.

12. The mobile terminal device according to claim 1, wherein, when the second application is automatically activated in response to the user selection of the first application, the second application is activated with a lower task priority than when the second application is activated in response to a user selection of the second application.

13. The mobile terminal device according to claim 1, wherein the controller is further configured to, subsequently, when the first and second display modules are switched to the open state while the first application remains activated, display the second operation screen on the second display.

14. The mobile terminal device according to claim 13, wherein the controller is further configured to, subsequently, when the first and second display modules are switched back to the closed state while the first application remains activated, stop display of the second operation screen on the second display while keeping the second application activated.

* * * * *